Figure 5:
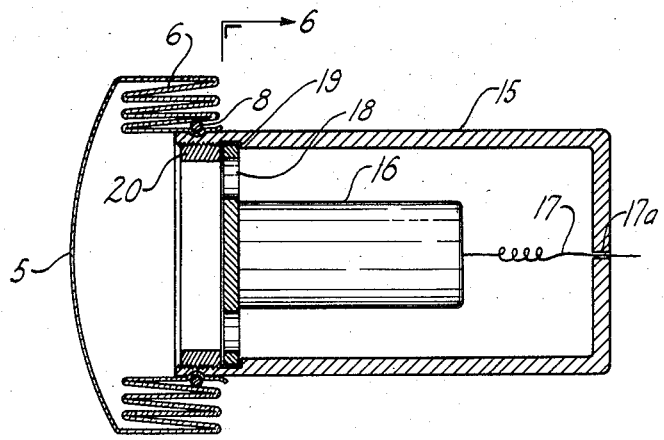

Sept. 2, 1958           J. J. ZICCARDI           2,850,291
PROTECTIVE DEVICES FOR PASSENGERS IN MOVING VEHICLES
Filed Oct. 3, 1957           2 Sheets-Sheet 1
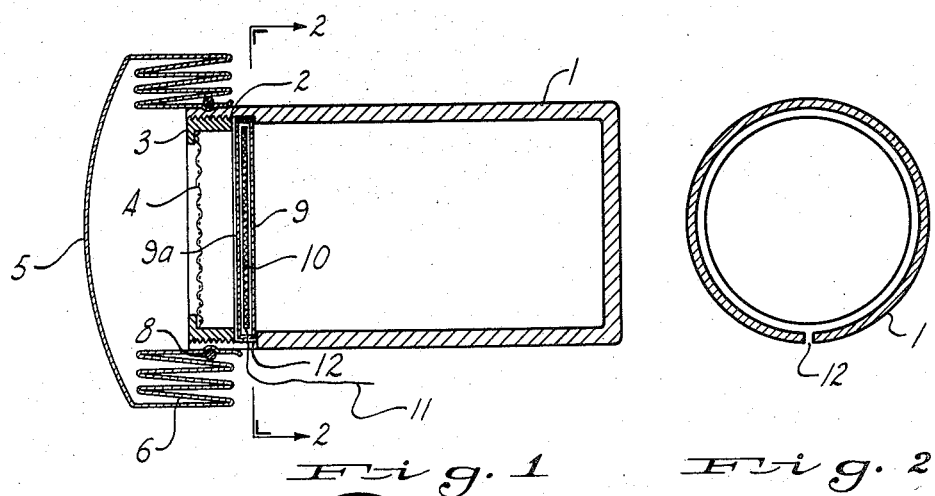
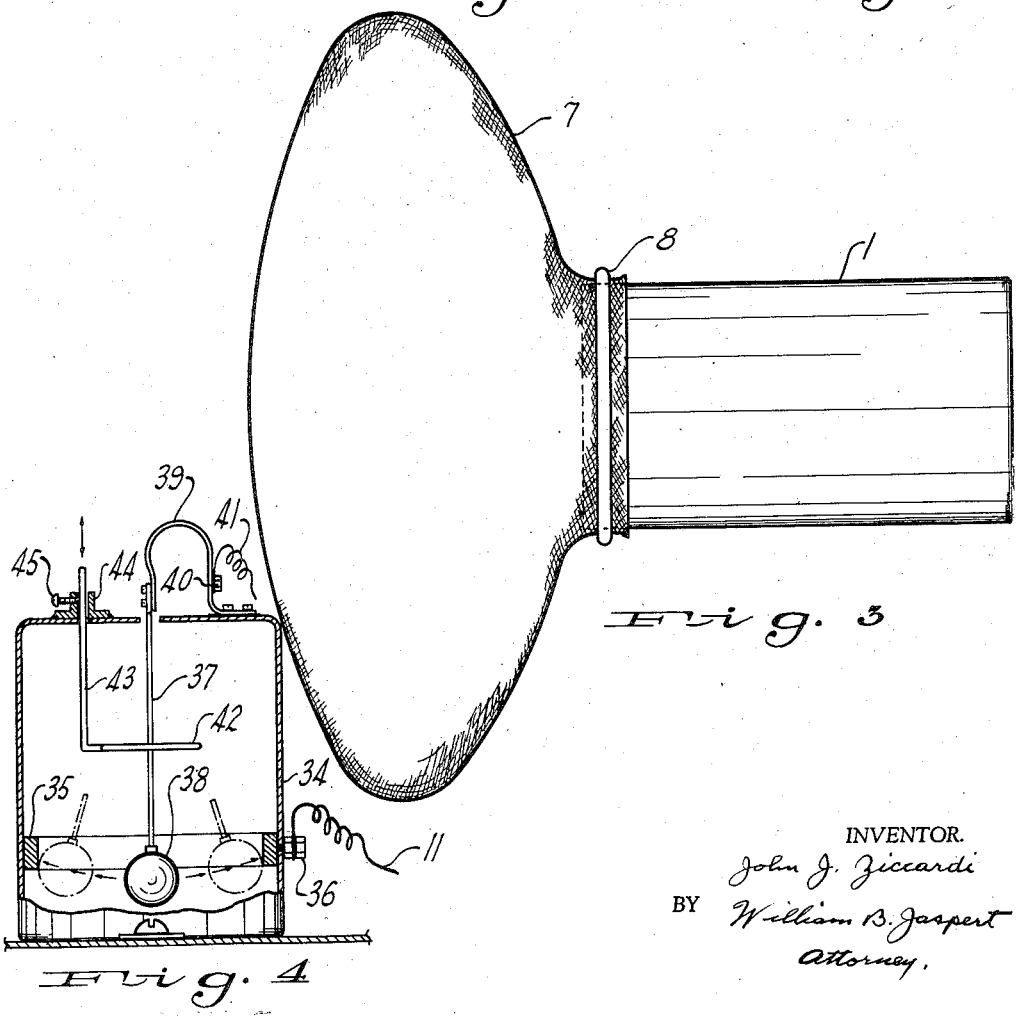
INVENTOR.
John J. Ziccardi
BY William B. Jaspert
Attorney.

Sept. 2, 1958  J. J. ZICCARDI  2,850,291
PROTECTIVE DEVICES FOR PASSENGERS IN MOVING VEHICLES
Filed Oct. 3, 1957  2 Sheets-Sheet 2

INVENTOR.
John J. Ziccardi
BY William B. Jaspert
Attorney.

United States Patent Office 2,850,291
Patented Sept. 2, 1958

2,850,291

PROTECTIVE DEVICES FOR PASSENGERS IN MOVING VEHICLES

John J. Ziccardi, Evans City, Pa., assignor of fifty percent to William B. Jaspert, Pittsburgh, Pa.

Application October 3, 1957, Serial No. 688,015

5 Claims. (Cl. 280—150)

This invention relates to new and useful improvements in inflatable protective devices for use in automobiles, aircraft, boats and the like where the occupants are subject to impact by sudden stoppage or rapid deceleration of the moving vehicle. It is among the objects of this invention to provide an inflatable balloon-like cushion which will instantly fill the space in which the occupant finds himself if the vehicle is subjected to impact as in a collision, the inflatable element being filled with a pressure fluid such as compressed air or a gas which is released by inertia responsive means.

It is a further object of the invention to provide a mechanism releasing the expansible material instantly upon impact or collision by the application of forces from any direction.

Heretofore, attempts for employing inflatable protective devices for the protection of passengers in vehicles utilized control means such as sliding pistons for releasing valves which would permit compressed air or gases to escape into the expansible element but such devices are operative only when the forces are applied in one or two directions.

In accordance with the present invention, an inertia responsive switch controlling an electrical circuit that releases the explosive charge for rendering the device operative is employed together with adjustable means for rendering the inertia responsive switch operative under abnormal operating conditions of the vehicle.

Figure 6:
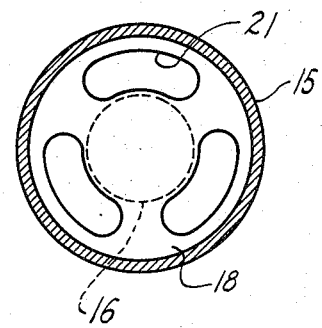
Figure 7:
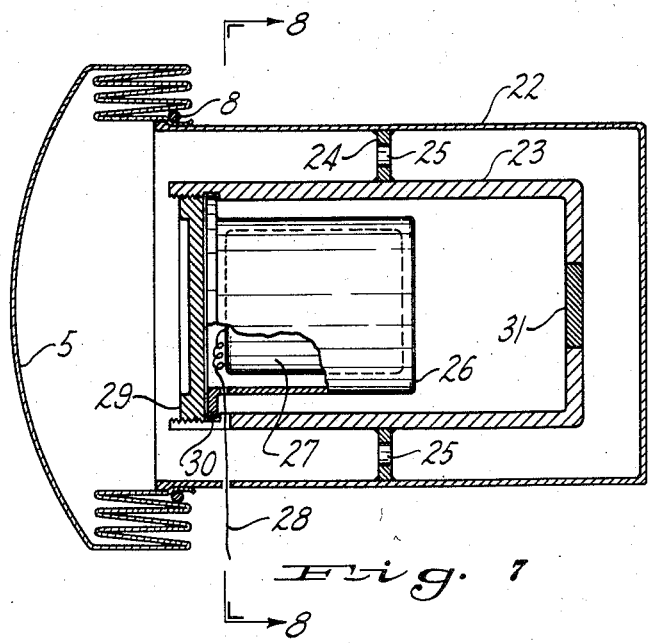
Figure 8:
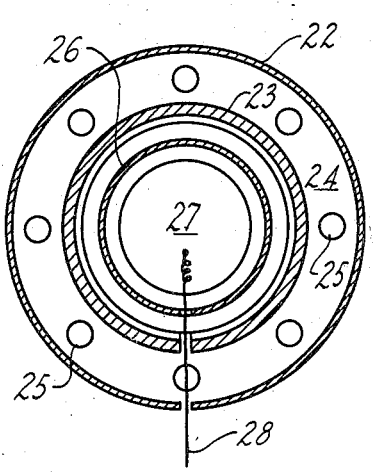

The invention will become more apparent from a consideration of the accompanying drawings constituting a part hereof in which like reference characters designate like parts and in which:

Figure 1 is a cross-sectional view of a protective device embodying the principles of this invention;

Figure 2, a cross-sectional view taken along the line 2—2 of Figure 1;

Figure 3, a side elevational view of the device of Figure 1 with the protective device in its expanded position;

Figure 4, a vertical cross-sectional view partially in elevation, of an inertia responsive switch and electrical circuit employed in the operation of the protective device;

Figure 5, a cross-sectional view of a modified form of protective device;

Figure 6, a cross-section taken along the line 6—6 of Figure 5;

Figure 7, a vertical sectional view of a modified form of protective device utilizing both an explosive member and $CO_2$ gas; and Figure 8, a cross-section taken along the line 8—8 of Fig. 7.

With reference to Figure 1 of the drawing, the numeral 1 designates a steel container having a threaded end 2 for receiving a threaded ring nut 3 that supports a screen 4. An inflatable cushion-like member 5 is mounted on the ring nut 3 with its main body portion folded as shown as 6, so that when it is expanded as by compressed air or gas, it will acquire a cushion or balloon-like shape 7 as shown in Figure 3 of the drawing.

The expansible safety device 5 is secured to the container 1 by a ring 8 and a steel diaphragm 9 and 9a is disposed against a shoulder of a steel casing 1 and held in place by the ring nut 3.

An explosible element consisting of a small charge of explosive 10 is disposed between the diaphragms 9—9a and has a suitable firing wire 11 connected thereto, the wire extending through a slot 12 in the casing 1 as is more clearly shown in Figure 2.

The firing wire 11 is connected in a suitable electrical circuit operated by an inertia responsive switch in a manner that will be hereinafter explained in connection with a description of Figure 4 of the drawing.

Referring to Figure 5, a steel casing 15 supports an explosive cartridge 16 that has a wire 17 extending through an opening 17a, the wire being connected to the inertia responsive switch of Figure 4. The cartridge 16 is supported by a spider 18 resting against a shoulder 19 of the steel casing 15 where it is secured by means of a ring nut 20.

The spider 18 is provided with relatively large openings for the free passage of the gases that are released by the explosion of the member 16, the gases passing into the inflatable element 5 to expand the same in the manner shown in Figure 3 of the drawings.

In the form of the device shown in Figures 7 and 8, the expansible element 5 is secured on an outer steel shell 22 that houses a steel casing 23 which may be secured to the shell 22 by a spider-like support 24 having openings 25 therein for the free passage of gases as will be hereinafter explained.

Within the casing 23 there is contained liquid $CO_2$ gas and within the casing 23 is another casing or housing 26 that contains an explosive 27 having a wire connection 28 to the inertia responsive switch of Figure 4. The explosive housing element 26 is secured in the casing 23 by a ring nut 29 abutting a flange 30 in the manner shown.

The end of the steel casing 23 is provided with a plug 31 made of a material that would burst when the explosive charge 27 is ignited, and the liquid $CO_2$ gas would escape into the space between casing 23 and the outer shell 22 and pass through the openings 25 into the inflatable safety device 5.

The important feature of this invention is the inertia responsive switch that energizes the firing wire 11 of Figure 1, 17 of Figure 5, and 28 of Figure 7. This wire is designated by the numeral 11 in Figure 4 of the drawing.

Figure 4 shows a housing 34 which may be mounted in any portion of an automobile, aircraft or boat in any suitable manner so long as it is vertically disposed and more or less maintained in a vertical position at all times. The container 34 is of a non-conducting material and a band 35 of conducting material is disposed within the housing 34 and is provided with a terminal 36 to which the firing wire 11 is connected. An arm 37 carrying a terminal 38 of spherical shape is mounted on a spring-like member 39 which is connected by terminal 40 to a source of electrical energy by conductor 41. The arm 37 is operative within an annular guide 42 on the end of a rod 43 that is adjustably mounted in a ferrule 44 and secured by a set screw 45.

By adjusting the height of the circular or annular guide 42, movement of the arm 37 is restricted. If, however, the vehicle in which the inertia responsive switch is mounted is subjected to sudden stopping or rapid deceleration, as in a collision, the flexible arm 37 will permit the spherical terminal 38 to flex sufficiently beyond the restraining annular guide 42 to contact the conducting band 35 and close the circuit with the firing wire 11 thus igniting the explosive charge that releases the pressure fluid into the inflatable safety device as heretofore explained.

By adjusting the vertical position of the annular retaining member 42, movement of the arm 37 within the inner periphery of the ring 42 will not permit contact of the spherical terminal 38 with the conductor ring 35 for normal operating conditions. It is apparent, however, that terrific impact force would cause the spherical terminal 38 to effect momentary contact with the conductor 35 and since the latter is an annulus, the contact will be effected no matter from which direction the impact force may be applied.

Thus, contrary to the attempts heretofore made, the inertia responsive switch is operative in any direction and furthermore, by utilizing an electrical switch of the inertia responsive type and an electrical circuit for igniting or firing the charge, the expansible safety device becomes operative at the instance of impact to inflate the expansible cushion or balloon-like element and completely fill the space, thus restraining the body of the occupant against movement in any direction.

After a collision and the safety device has been operative, it is evident that it can be removed in any one of different ways, as by puncturing the inflated material or by tearing it off its mounting ring. Since the inflatable element is supported on all sides by the compartment or walls of the vehicle in which it is disposed after it is expanded very little means are needed to fasten the same to the container on which it is mounted.

It is evident from the foregoing description of the invention that expansible protective devices released by means of an explosive controlled by an inertia responsive switch will effectively and instantly protect an occupant of a vehicle or aircraft when it is in collision.

Although one embodiment of the invention has been herein illustrated and described, it will be evident to those skilled in the art that various modifications may be made in the details of construction without departing from the principles herein set forth.

I claim:

1. An inertia actuated crash protector for vehicles comprising an inflatable bag-like resilient material connected to a source of pressure fluid having inertia responsive means including an electrical circuit and a firing wire for firing an explosive for releasing said pressure fluid, said inertia responsive means consisting of an annular conductor ring and a contact terminal suspended from a flexible arm, said conductor ring and terminal being connected in an electrical circuit and said firing wire being connected in said circuit, whereby upon movement of the suspended contact terminal in any direction to contact with said conductor ring the firing wire is energized.

2. An inertia actuated crash protector for vehicles comprising an inflatable bag-like resilient material connected to a source of pressure fluid having inertia responsive means including an electrical circuit and a firing wire for firing an explosive for releasing said pressure fluid, said inertia responsive means consisting of an annular conductor ring and a contact terminal suspended from a flexible arm, a retaining ring for said flexible arm restricting its movement to normally prevent contact of said suspended contact terminal, said conductor ring and terminal being connected in an electrical circuit and said firing wire being connected in said circuit, whereby upon movement of the suspended contact terminal in any direction to make contact with said conductor ring the firing wire is energized.

3. An inertia actuated crash protector for vehicles comprising an inflatable bag-like resilient material connected to a source of pressure fluid having inertia responsive means including an electrical circuit and a firing wire for firing an explosive for releasing said pressure fluid, said inertia responsive means consisting of an annular conductor ring and a contact terminal suspended from a flexible arm, a retaining ring for said flexible arm restricting its movement to normally prevent contact of said suspended contact terminal, said conductor ring and terminal being connected in an electrical circuit and said firing wire being connected in said circuit, whereby upon movement of the suspended contact terminal in any direction to contact said conductor ring the firing wire is energized, said retaining ring being adjustable along the longitudinal axis of said flexible arm whereby contact of said terminal with said conductor ring may be regulated to be effected in response to a predetermined impact force.

4. An inertia actuated crash protector for vehicles comprising an inflatable bag-like resilient material connected to a source of pressure fluid having inertia responsive means including an electrical circuit and a firing wire for firing an explosive for releasing said pressure fluid, said inertia responsive means consisting of an annular conductor ring and a contact terminal suspended from a flexible arm, a retaining ring for said flexible arm restricting its movement to normally prevent contact of said suspended contact terminal with said conductor ring, said conductor ring and terminal being connected in an electrical circuit and said firing wire being connected in said circuit whereby upon movement of the suspended contact terminal in any direction to contact the conductor ring the firing wire is energized.

5. An inertia actuated crash protector for vehicles comprising an inflatable bag-like resilient material connected to a source of pressure fluid having inertia responsive means including an electrical circuit and a firing wire for firing an explosive for releasing said pressure fluid, said inertia responsive means consisting of an annular conductor ring and a contact terminal suspended from a flexible arm, and a retaining ring for said flexible arm to restrain its movements said retaining ring being adjustable along the longitudinal axis of said flexible arm whereby contact of the suspended contact terminal with said conductor ring may be regulated to be effected in response to a predetermined impact force applied to said flexible arm.

References Cited in the file of this patent

UNITED STATES PATENTS

| 2,364,010 | Underwood | Nov. 28, 1944 |
| 2,477,933 | Labser | Aug. 2, 1949 |
| 2,649,311 | Hetrick | Aug. 18, 1953 |

FOREIGN PATENTS

| 896,312 | Germany | Nov. 12, 1953 |